United States Patent
Tseng et al.

(10) Patent No.: US 9,268,009 B2
(45) Date of Patent: Feb. 23, 2016

(54) COMPOUND CIRCUIT BOARD AND RADAR DEVICE

(71) Applicant: Wistron NeWeb Corporation, Hsinchu (TW)

(72) Inventors: Chien-Chung Tseng, Hsinchu (TW); Cheng-Hsiung Hsu, Hsinchu (TW); Tsai-Wang Chang, Hsinchu (TW); I-Shan Chen, Hsinchu (TW); Min-Jung Wu, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 357 days.

(21) Appl. No.: 13/938,236

(22) Filed: Jul. 10, 2013

(65) Prior Publication Data

US 2014/0313069 A1    Oct. 23, 2014

(30) Foreign Application Priority Data

Apr. 18, 2013   (TW) .............................. 102113822 A

(51) Int. Cl.
*G01S 7/03*   (2006.01)
*G01S 13/93*   (2006.01)

(52) U.S. Cl.
CPC ............... *G01S 7/032* (2013.01); *G01S 13/931* (2013.01)

(58) Field of Classification Search
CPC ............................... G01S 13/931; G01S 7/032
USPC .......................................... 342/175; 343/905
See application file for complete search history.

(56) References Cited

U.S. PATENT DOCUMENTS

| | | | |
|---|---|---|---|
| 2010/0073233 A1* | 3/2010 | Young ................ | H01Q 21/0025 342/373 |
| 2010/0225539 A1* | 9/2010 | Margomenos .......... | G01S 7/032 342/373 |

* cited by examiner

*Primary Examiner* — Timothy A Brainard
(74) *Attorney, Agent, or Firm* — Winston Hsu; Scott Margo

(57) ABSTRACT

A compound circuit board for a radar device includes a first substrate including a plurality of trace layers having a first trace layer formed with a digital signal processing unit and an electronic control unit in a first area, a second substrate including a plurality of trace layers having a second trace layer formed with an antenna module in a second area, and a prepreg layer between the first and second substrates for connecting the first and second substrates, wherein the first area and the second area in a first projecting result generated by projecting the first trace layer on the second trace layer are substantially overlapped.

17 Claims, 7 Drawing Sheets

COMPOUND CIRCUIT BOARD AND RADAR DEVICE

BACKGROUND OF THE INVENTION

1. Field of the Invention

The present invention relates to a compound circuit board and related radar device, and more particularly, to a compound circuit board with small thickness and related radar device.

2. Description of the Prior Art

An automotive radar system utilizes wireless signal transceivers disposed inside vehicle bumpers or grills to transmit or receive millimeter-wave wireless signals for ranging and information exchange applications. Since shock-absorbing Styrofoam or glass fibers are usually disposed inside the vehicle bumpers, the available space is limited, which therefore increases design difficulty for the wireless signal transceivers. In addition, if the automotive radar system is produced for sales of after-market, i.e. vendors for the radar systems do not participate in decision-making of materials and thickness of the bumpers, in such a condition, size requirements for the wireless signal transceivers become stricter in order to comply with different cars.

In general, a conventional wireless signal transceiver in an automotive radar system includes three major portions: digital signal processing (DSP), electronic control unit (EDU), and radio-frequency (RF), and each portion includes corresponding circuits and circuit boards. The DSP portion is mainly used for processing and controlling operations of the radar system; the RF portion includes elements such as a microwave antenna, a power amplifier, and a low noise amplifier, and works with a monolithic microwave integration circuit (MMIC) and related circuits to transmit and receive wireless signals; and the ECU portion is used to transmit safety-aided information to the users via a human-machine interface. In order to realize the three portions mentioned above, a conventional microwave automotive radar system needs to include a DSP board, an ECU board, and an RF antenna board accordingly. The substrates of the DSP board and the ECU board are made of FR4 material, and the RF antenna board requires a low dielectric constant and low loss substrate. Different boards are connected by a board-to-board connector so that the microwave automotive radar system may accurately detect relative distance, velocity, and angle of an object and generate warning signals to the users. In such a situation, even though the thickness of a circuit board is generally less than 2 mm, the volume or the thickness of the end-product often increases significantly (e.g., larger than 10 mm in general) after adding the connectors.

Due to the limited space for disposing the automotive radar product, it is a common goal in the industry to effectively reduce the volume or the total thickness of the automotive radar product.

SUMMARY OF THE INVENTION

Therefore, it is an objective of the present invention to provide a compound circuit board and related radar device to reduce the volume and the thickness of an automotive radar product.

The present invention discloses a compound circuit board for a radar device. The compound circuit includes a first substrate, comprising a plurality of trace layers having a first trace layer formed with a digital signal processing unit and an electronic control unit in a first area; a second substrate, comprising a plurality of trace layers having a second trace layer formed with an antenna module in a second area; and a prepreg layer, between the first substrate and the second substrate for connecting the first and second substrates, wherein the first area and the second area in a first projecting result generated by projecting the first trace layer on the second trace layer are substantially overlapped.

The present invention further discloses a radar device, comprising a base, a compound circuit board disposed on the base, and a metal shielding cover disposed on the compound circuit board. The compound circuit board comprises a first substrate including a plurality of trace layers having a first trace layer formed with a digital signal processing unit and an electronic control unit in a first area, a second substrate including a plurality of trace layers having a second trace layer formed with an antenna module in a second area, and a prepreg layer between the first substrate and the second substrate for connecting the first and second substrates. The coverage of the metal shielding cover in relation to the compound circuit board does not include the second area, and the first area and the second area in a first projecting result generated by projecting the first trace layer on the second trace layer are substantially overlapped.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
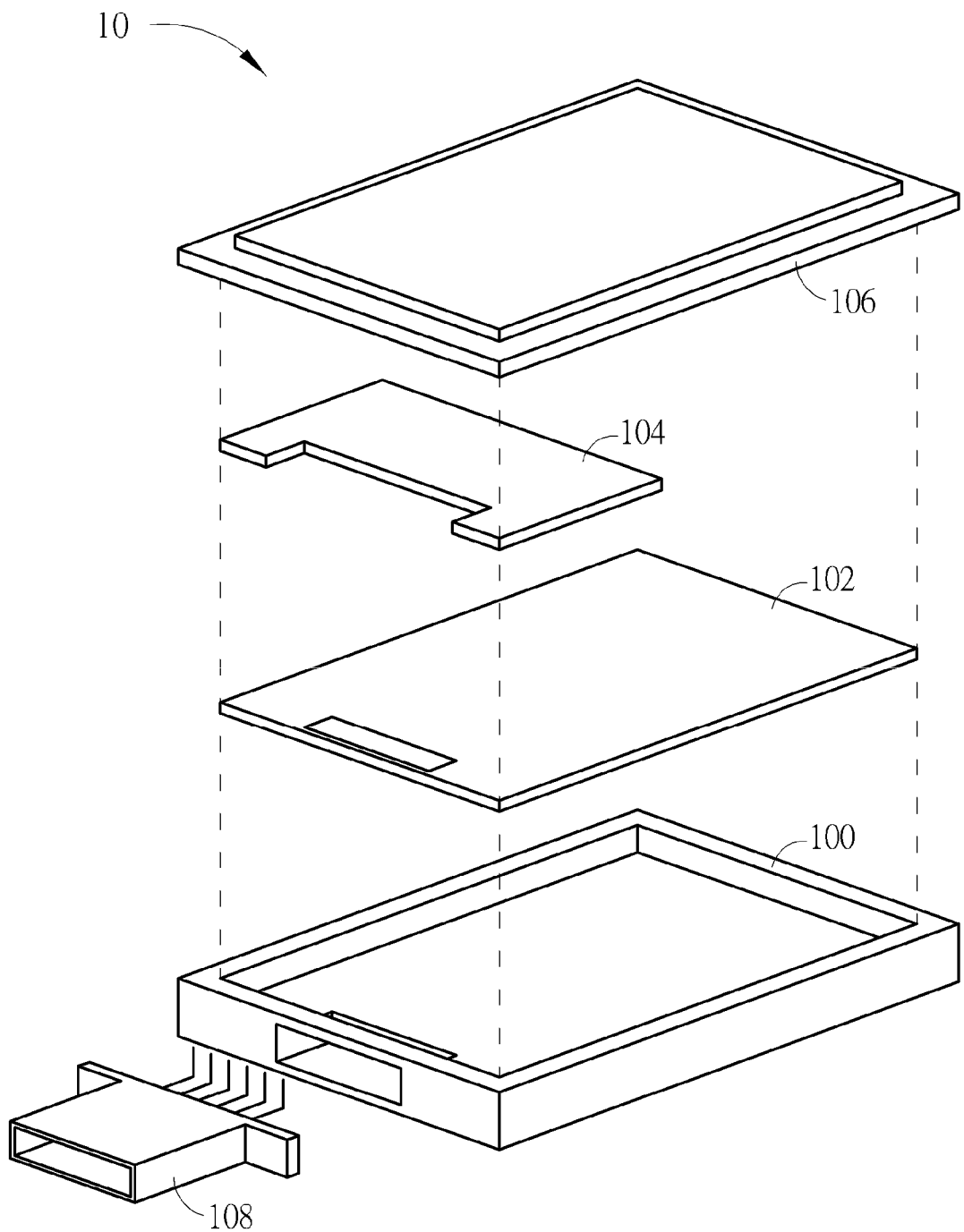
FIG. 1 is a schematic diagram of a radar device according to an embodiment of the present invention.

Please refer to FIG. 1, which illustrates a schematic diagram of a radar device 10 according to an embodiment of the present invention. The radar device 10 is used in an automotive radar system for realizing a wireless signal transceiver with small thickness. The radar device 10 includes a substrate 100, a compound circuit board 102, a metal shielding cover 104, a radome 106, and a connector 108. The substrate 100 may be made of hard material(s) such as metal or plastic for loading or covering other devices. The compound circuit board 102 is composed of two multilayer substrates with a prepreg in between, and the thickness of the compound circuit board 102 is substantially less than 5 mm. The compound circuit board 102 is used for disposing control chips, radio-frequency (RF) or baseband circuits and antenna components for the radar device 10. The metal shielding cover 104 is disposed on the compound circuit board 102, and a coverage area thereof does not include an antenna area of the compound circuit board 102. Besides, the radome 106 may be assembled with the substrate 100 to protect the internal components. The connector 108 may conform to well-known automotive communication specifications such as OBDI, OBD-1.5, EOBD, and EOBD II for connecting an external control device (e.g. an automotive electronic control unit) so that the radar device 10 may exchange signals with the external control device.

In brief, the conventional wireless signal transceiver of an automotive radar system requires three circuit boards for disposing a digital signal processing module, an electronic control unit, and an RF module, respectively. Therefore, it is hard to reduce the overall thickness of the conventional wireless signal transceiver due to the board-to-board connectors, and consequently, the complexity of the assembling procedures is increased. In comparison, the present invention utilizes the single compound circuit board 102 for disposing the digital signal processing module, the electronic control unit, and the RF modules for the radar device 10, which may therefore reduce the thickness of the radar device 10 to be less than 5 mm (e.g. 2.4 mm), so as to minimize the volume or the total thickness of the radar device 10.

Figure 2:
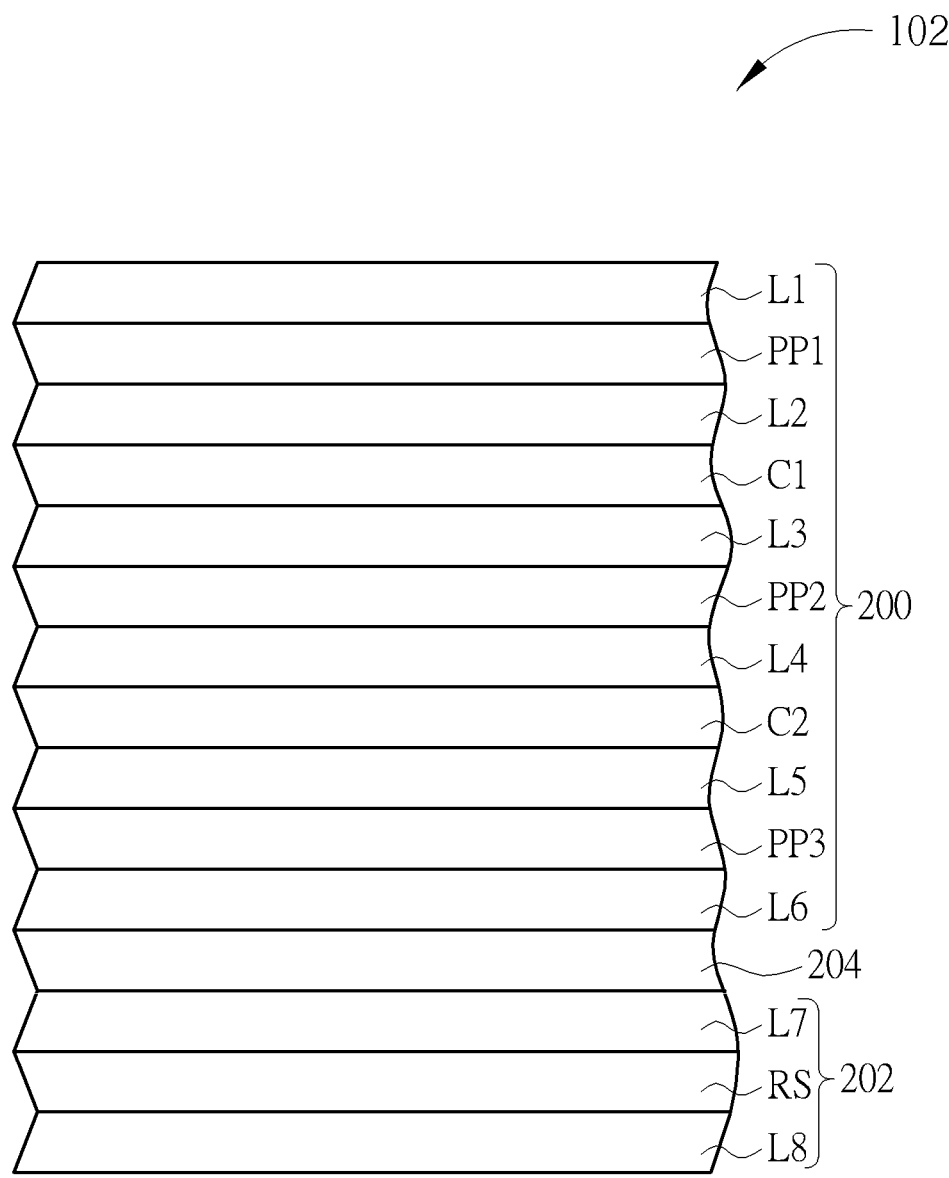
FIG. 2 is a schematic diagram of a compound circuit board shown in FIG. 1 according to an embodiment of the present invention.

In detail, please continue refer to FIG. 2, which is a schematic diagram of a compound circuit board 102 shown in FIG. 1 according to an embodiment of the present invention. As shown in FIG. 2, the compound circuit board 102 includes a first substrate 200, a second substrate 202, and a prepreg 204. Preferably, the first substrate 200 may conform to an FR4 substrate specification, and the second substrate 202 may conform to a Rogers substrate specification for low dielectric constant and low loss. In other words, the first substrate 200 and the second substrate 202 have different coefficient of thermal expansion (CTE). For example, a substrate conforming to an FR4 substrate specification has a CTE of about (14,13,175) ppm/° C. in relation to the (X,Y,Z) coordinates, and a substrate conforming to a Rogers substrate specification has a CTE of about (14,13,175) ppm/° C. in relation to the (X,Y,Z) coordinates. As a result, the first substrate 200 and the second substrate 202 have different CTEs, which results in different bending levels as the temperature increases. In such a condition, the present invention utilizes a prepreg 204 with a thickness between 5 mils and 10 mils to combine the first substrate 200 and the second substrate 202 into the compound circuit board 102, so as to prevent the compound circuit board 102 from bending or sticking-up.

In addition, the first substrate 200 is primarily used for disposing low frequency circuit and components such as a digital signal processing unit and an electronic control unit, and the second substrate 202 is used for disposing RF circuit or components such as an antenna and a power divider. Since RF signal is sensitive to interference, the present invention further configures the layout style of the components or circuit on the first substrate 200 and the second substrate 202 properly in order to reduce the interference between circuitries.

In detail, as shown in FIG. 2, the first substrate 200 includes, from top to bottom, a trace layer L1, a prepreg PP1, a trace layer L2, a core C1, a trace layer L3, a prepreg PP2, a trace layer L4, a core C2, a trace layer L5, a prepreg PP3, and a trace layer L6. The second substrate 202 includes, from top to bottom, a trace layer L7, a substrate RS, and a trace layer L8. Circuits or components to be disposed in the trace layers L1-L8 are shown as Table 1.

TABLE 1

| Layer | Circuit type |
| --- | --- |
| L1 | Digital and analog components and circuit |
| L2 | Low-speed digital signal circuit |

TABLE 1-continued

| Layer | Circuit type |
| --- | --- |
| L3 | Grounding isolation for digital signal and power supply circuit |
| L4 | Power supply circuit |
| L5 | High-speed digital and analog signal circuit |
| L6 | Grounding isolation for mixed-signal and RF circuit |
| L7 | RF ground |
| L8 | RF components and circuit |

Figure 3A:
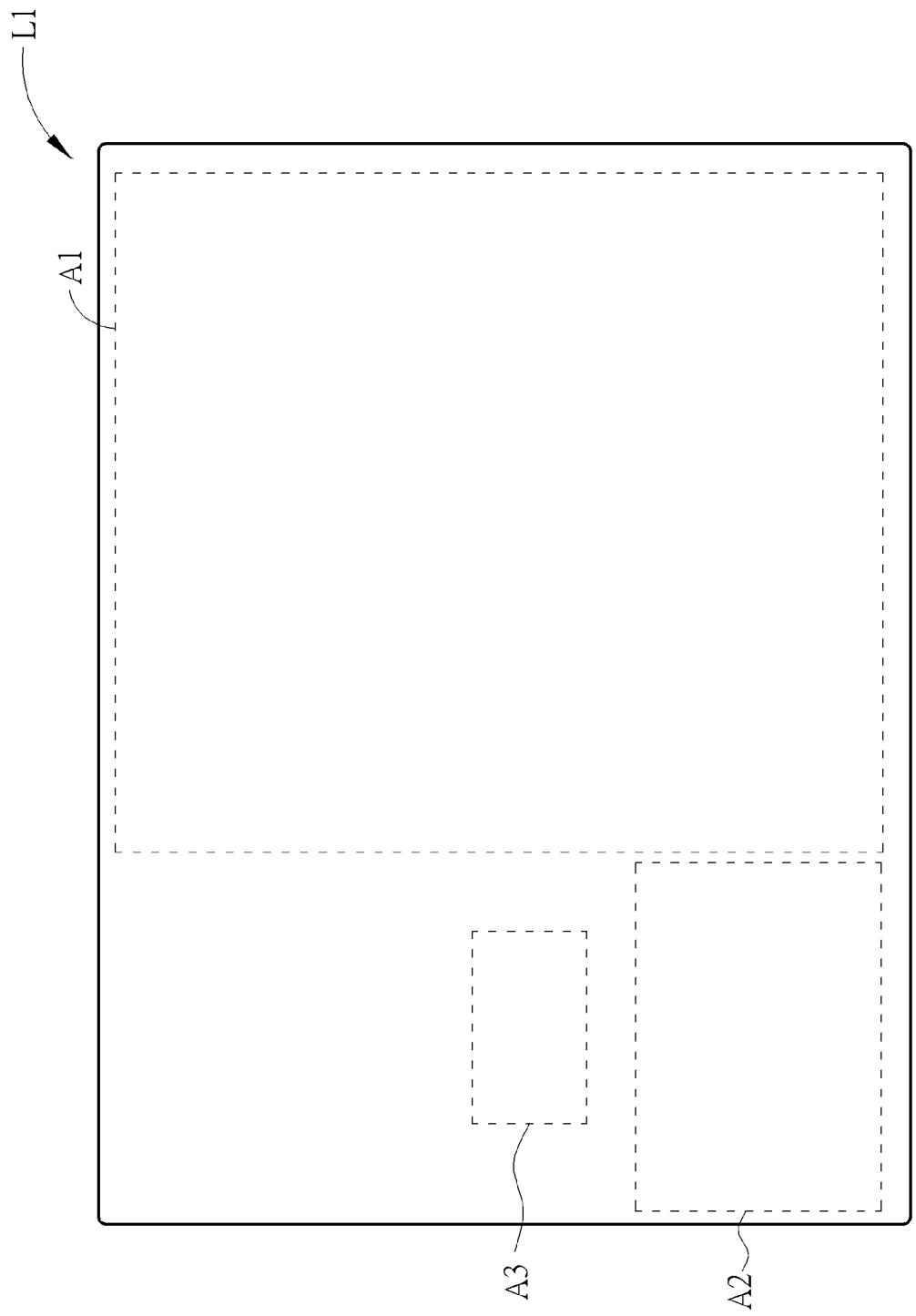
FIG. 3A to FIG. 3C are schematic diagrams of three respective trace layers shown in FIG. 1.
Figure 3B:
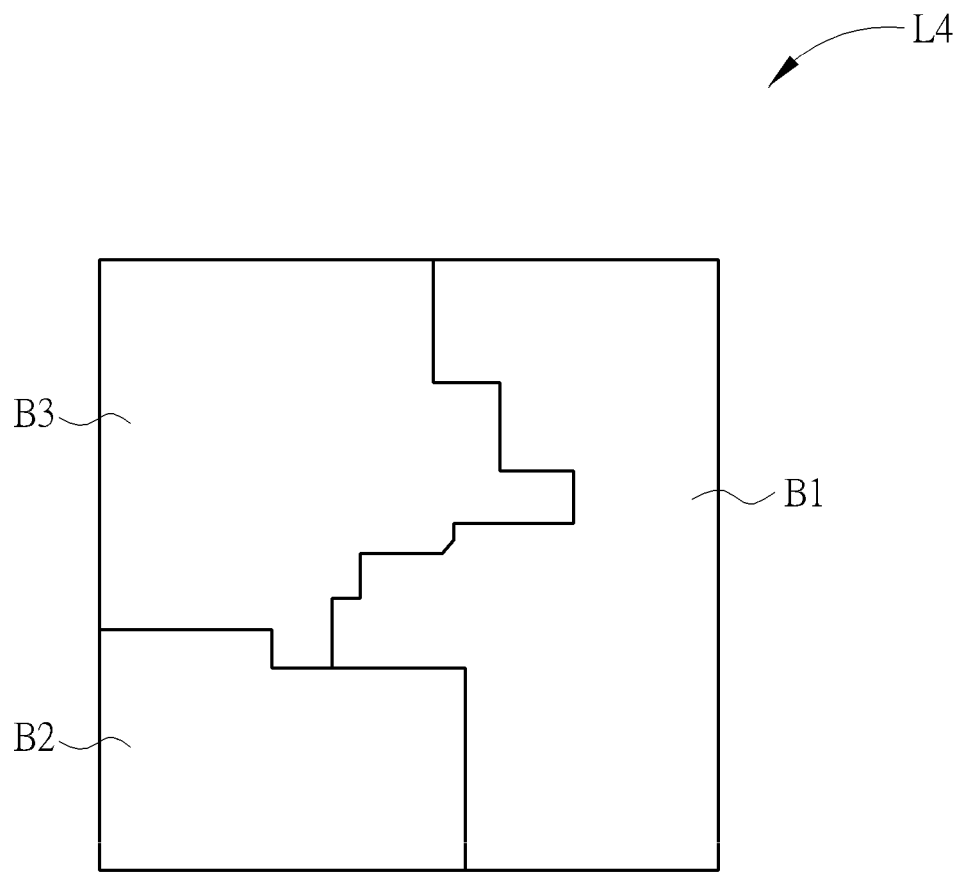
Figure 3C:
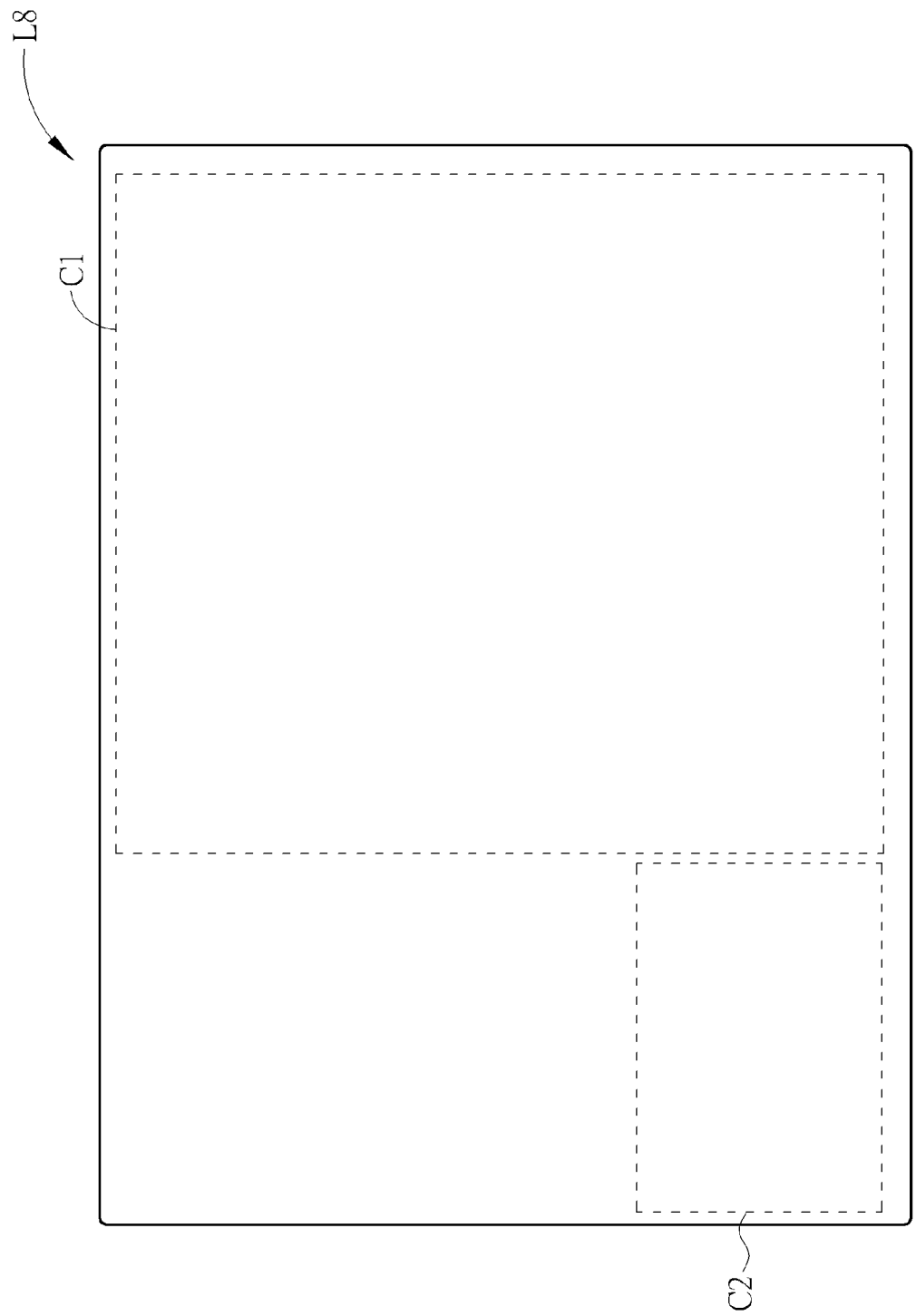

Furthermore, please refer to FIG. 3A to FIG. 3C, which are schematic diagrams of the trace layers L1, L4, and L8, respectively. As shown in FIG. 3A, an area A1 of the trace layer L1 is used for disposing elements such as the digital signal processing unit, the electronic control unit, and memory; an area A2 is used for disposing circuits such as an analog-to-digital converter and an intermediate-frequency (IF) amplifier; and an area A3 is used for disposing signal processing circuit related to the connector 108 (e.g. CANBUS transceiver unit). As shown in FIG. 3B, the trace layer L4 is used for disposing the power supply circuit, wherein different power supply modules are disposed on areas B1, B2, and B3 for supplying different power sources, such as 3.3 volts, 3.5 volts, and 5 volts. As shown in FIG. 3C, an area C1 of the trace layer L8 is used for disposing an antenna module, and an area C2 is used for disposing an RF processing chip and passive circuit modules.

Note that FIG. 3A to FIG. 3C are individual floor plan diagrams of stacked trace layers L1, L4, and L8. In other words, when projecting the trace layers L1 and L4 onto the trace layer L8, the areas A1, B1 are partially overlapped with the area C1, the areas A2, B2 are partially overlapped with the area C2, and the area A3 is partially overlapped with the area B3. In such a condition, interference to the antenna module may be effectively reduced for improving signal transmitting/receiving performance. Besides, in the area A1, the digital signal processing unit is preferably disposed beside the analog-to-digital converter in the area A2, and the memory needed for operating the digital signal processing unit is disposed beside the digital signal processing unit for further reducing the interference to the antenna module.

Besides, the radar device 10 is an embodiment of the present invention, which utilizes the compound circuit board 102 to reduce the thickness. Those skilled in the art may make alterations and modifications accordingly. For example, the material of the prepreg 204 is not limited to a specific kind. The prepreg 204 may be composed of a glass fiber cloth with epoxy film, any dielectric which conforms to the FR4 substrate specification, or the dielectric generated by ISOLA for bonding and fixing the first substrate 200 and the second substrate 202.

Furthermore, Table 1 illustrates applicable circuit types in the trace layers L1-L8, but is not limited thereto. For example, the circuit types of the trace layers L2 and L5 are exchangeable, i.e., the high-speed digital and analog circuit is laid out in trace layer L2 and the low-speed digital circuit is laid out in the trace layer L5. Besides, in this example, the grounding layers are distributed in the trace layers L3, L6, and L7, so as to isolate the high-frequency analog and digital signals, and isolate the power supply and signals as well to prevent from noise coupling. On the other hand, the trace layer L6 may be designed as a grounding isolation layer between the mixed-signal and RF circuits, which may provide a good grounding for the mixed-signal circuit. The entire grounding in the trace layer L7 is analog grounded to zero impedance, so as to provide better signal integrity for the high frequency signals.

In FIG. 2, the compound circuit board 102 is formed into an eight-layer compound circuit board by the six-layer first substrate 200 and the two-layer second substrate 202, but should not be limited thereto. For example, please refer to FIG. 4, which is a schematic diagram of the compound circuit board 102 shown in the FIG. 1 according to another embodiment of the present invention. As shown in the FIG. 4, the compound circuit board 102 includes a first substrate 400, a second substrate 402, and a prepreg 404. Preferably, the first substrate 400 conforms to an FR4 substrate specification, and the second substrate 402 conforms to a Rogers substrate specification. The first substrate 400 includes, from top to bottom, a trace layer L1', a prepreg PP1', a trace layer L2', a core C1', a trace layer L3', a prepreg PP2', and a trace layer L4'. The second substrate 402 includes, from top to bottom, a trace layer L5', a substrate RS', and a trace layer L6'. Circuits or components to be disposed in the trace layers L1'-L6' are shown as Table 2.

TABLE 2

| Layer | Circuit type |
| --- | --- |
| L1' | Digital and analog components and circuit |
| L2' | Grounding isolation |
| L3' | Power supply circuit |
| L4' | Digital and analog signal circuit |
| L5' | Grounding isolation for mixed-signal and RF circuit |
| L6' | RF components and circuit |

Figure 4:
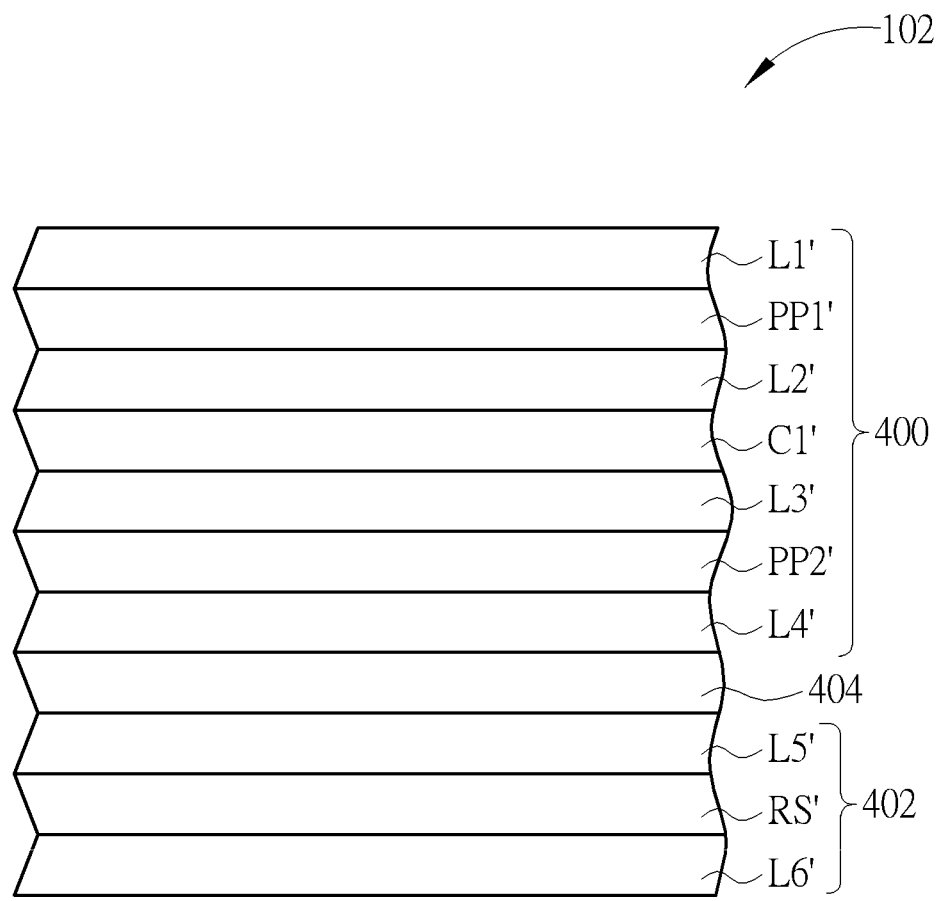
FIG. 4 is a schematic diagram of a compound circuit board shown in FIG. 1 according to another embodiment of the present invention.

The layout and partition style of the trace layers L1', L3', and L6' in the compound circuit board 102 shown in FIG. 4 is similar to that of the trace layers L1, L4, and L8, so as to reduce the interference to the antenna module.

Figure 5:
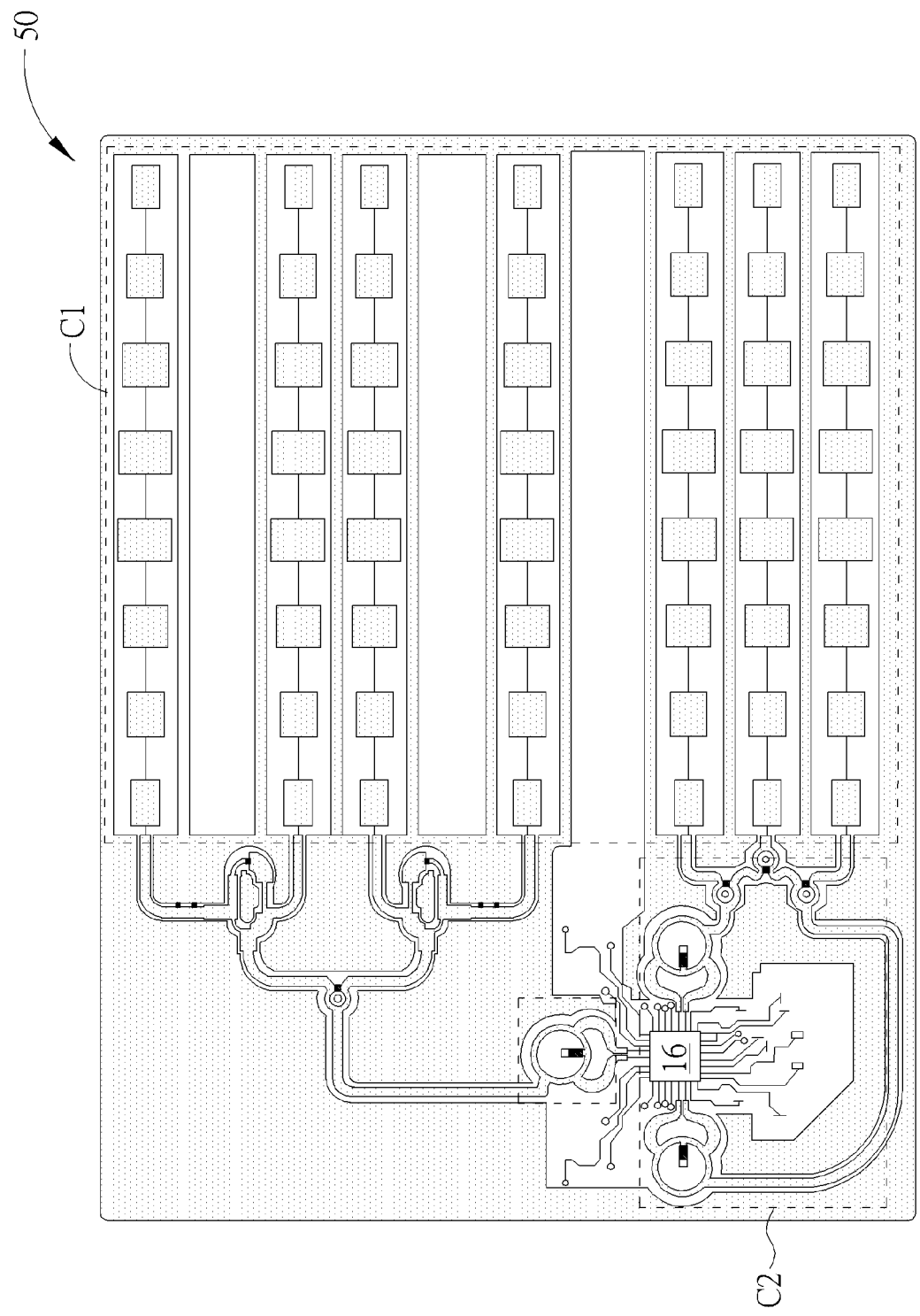
FIG. 5 is a schematic diagram of a radio-frequency (RF) transceiver according to an embodiment of the present invention.

On the other hand, design of the RF components and circuit (i.e., the trace layer L8 in FIG. 2 or the trace layer L6' in FIG. 4) is not limited to any specific structure, as long as the antenna module is disposed in the area C1 and the RF processing chip and the passive circuit modules are disposed in the area C2. For example, the RF transceiver system provided by the applicant and filed in U.S. patent application Ser. No. 13/866,013 may be applied to the present invention as well. Please refer to FIG. 5, which illustrates a schematic diagram of an RF transceiver system 50. The RF transceiver system 50 is designed according to the U.S. patent application Ser. No. 13/866,013, wherein an antenna array is formed in the area C1, and an RF signal processing unit and passive circuits are formed in the area C2. For the details of the RF transceiver system 50, please refer to the U.S. patent application Ser. No. 13/866,013.

From the above embodiments, the projection areas of the first substrate 200 (or 400) and the second substrate 202 (or 402) are substantially the same, e.g., 88 mm×70 mm, but are not limited thereto. Those skilled in the art may enlarge or reduce the projection areas according to different applications. More importantly, the thickness of the compound circuit board 102 may be less than 5 mm, e.g., 2.4 mm. In comparison with the conventional technologies, the product thickness is significantly reduced, which is beneficial for the automotive radar system design, especially for the sales of after-market.

To sum up, the wireless signal transceiver of the conventional radar system requires the board-to-board connectors to connect different boards, which significantly increases the volume and the overall thickness of the end product. In comparison, the present invention utilizes the compound circuit board to save the board-to-board connectors and prevent the board from bending and sticking-up due to CTE differences between different boards. Accordingly, the present invention may effectively reduce the overall thickness of the radar device, so as to broaden the application scope of the product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A compound circuit board for a radar device, comprising:
    a first substrate, comprising a plurality of trace layers having a first trace layer formed with a digital signal processing unit and an electronic control unit in a first area;
    a second substrate, comprising a plurality of trace layers having a second trace layer formed with an antenna module in a second area; and
    a prepreg layer, between the first substrate and the second substrate for connecting the first and second substrates;
    wherein the first area and the second area in a first projecting result generated by projecting the first trace layer on the second trace layer are substantially overlapped.

2. The compound circuit board of claim 1, wherein the first trace layer is formed with an analog-to-digital converter and an analog intermediate-frequency amplifier in a third area, the second trace layer is formed with a radio-frequency processing chip and a passive circuit module in a fourth area, and the third area and the fourth area in the first projecting result are substantially overlapped.

3. The compound circuit board of claim 2, wherein a third trace layer in the first substrate is formed with a first power supply module in a fifth area and a second power supply module in a sixth area, the fifth area and the second area in a second projecting result generated by projecting the third trace layer on the second trace layer are substantially overlapped, and the sixth area and the fourth area in the second projecting result are substantially overlapped.

4. The compound circuit board of claim 1, wherein a thickness of the prepreg layer is between 5 mils and 10 mils.

5. The compound circuit board of claim 1, wherein projecting areas of the first substrate and the second substrate are substantially the same.

6. The compound circuit board of claim 5, wherein a cross-section thickness of the compound circuit board is smaller than 5 mm.

7. The compound circuit board of claim 1, wherein the first substrate conforms to an FR4 substrate specification.

8. The compound circuit board of claim 1, wherein the radar device is a wireless signal transceiver of an automotive radar system.

9. A radar device, comprising:
    a base;
    a compound circuit board, disposed on the base, comprising:
        a first substrate, comprising a plurality of trace layers having a first trace layer formed with a digital signal processing unit and an electronic control unit in a first area;
        a second substrate, comprising a plurality of trace layers having a second trace layer formed with an antenna module in a second area; and a prepreg layer, between the first substrate and the second substrate for connecting the first and second substrates;

a metal shielding cover, disposed on the compound circuit board, wherein a coverage of the metal shielding cover in relation to the compound circuit board does not include the second area;

wherein the first area and the second area in a first projecting result generated by projecting the first trace layer on the second trace layer are substantially overlapped.

10. The radar device of claim 9, wherein the first trace layer is formed with an analog-to-digital converter and an analog IF amplifier in a third area, the second trace layer is formed with an RF processing chip and a passive circuit module in a fourth area, and the third area and the fourth area in the first projecting result are substantially overlapped.

11. The radar device of claim 10, wherein a third trace layer in the first substrate is formed with a first power supply module in a fifth area and a second power supply module in a sixth area, the fifth area and the second area in a second projecting result generated by projecting the third trace layer on the second trace layer are substantially overlapped, and the sixth area and the fourth area in the second projecting result are substantially overlapped.

12. The radar device of claim 9, wherein a thickness of the prepreg layer is between 5 mils and 10 mils.

13. The radar device of claim 9, wherein projecting areas of the first substrate and the second substrate are substantially the same.

14. The radar device of claim 13, wherein a section thickness of the compound circuit board is smaller than 5 mm.

15. The radar device of claim 9, wherein the first substrate conforms to an FR4 substrate specification.

16. The radar device of claim 9, wherein the radar device is a wireless signal transceiver of an automotive radar system.

17. The radar device of claim 9, further comprising a radome for combining with the base to enclosing the compound circuit board and the metal shielding cover.

* * * * *